United States Patent [19]

Sipple et al.

[11] Patent Number: 5,060,144
[45] Date of Patent: Oct. 22, 1991

[54] LOCKING CONTROL WITH VALIDITY STATUS INDICATION FOR A MULTI-HOST PROCESSOR SYSTEM THAT UTILIZES A RECORD LOCK PROCESSOR AND A CACHE MEMORY FOR EACH HOST PROCESSOR

[75] Inventors: Ralph E. Sipple, Shoreview; John R. Jordan, St. Paul; Anthony P. vonArx, New Brighton, all of Minn.

[73] Assignee: Unisys Corporation, Blue Bell, Pa.

[21] Appl. No.: 324,129

[22] Filed: Mar. 16, 1989

[51] Int. Cl.$^5$ .............................................. G06F 15/16
[52] U.S. Cl. ................................. 364/200; 364/243.44; 364/238.4; 364/228.1; 364/246.8; 364/266.3
[58] Field of Search ... 364/200 MS File, 900 MS File

[56] References Cited

U.S. PATENT DOCUMENTS

| | | | |
|---|---|---|---|
| 4,480,304 | 10/1984 | Carr et al. | 364/200 |
| 4,513,367 | 4/1985 | Chan et al. | 364/200 |
| 4,649,475 | 3/1987 | Scheuneman | 364/200 |
| 4,766,537 | 8/1988 | Zolnowsky | 364/200 |
| 4,802,085 | 1/1989 | Levy et al. | 364/200 |
| 4,802,086 | 1/1989 | Gay et al. | 364/200 |
| 4,833,601 | 5/1989 | Barlow et al. | 364/200 |

Primary Examiner—Gareth D. Shaw
Assistant Examiner—Maria Napiorkowski
Attorney, Agent, or Firm—Glenn W. Bowen; Mark T. Starr

[57] ABSTRACT

A Record Lock Processor is utilized in a multi-host data processing system to control the locking of Objects upon request of each of the multiple host data processors in non-conflicting manner. The Record Lock Processor has storage provisions which include a Lock List for storing bits that identify the Objects and bits that identify the requesting processor, a Queue List that stores entries that are formatted like the Lock List entry when a prior Lock List entry has been made for the same Object, and a Cache List for each processor that stores Cache List entries that identify each Object that is stored in the cache memories, each of which Cache List entries is associated with one of the requesting processors, wherein such Cache List entries include validity bits that identify whether each Object stored in a Cache List has a Valid or an Invalid status.

1 Claim, 8 Drawing Sheets

ON LOCK REQUEST

*CHANNEL INTERFACE OPERATION*

LL: LOCK LIST.
QL: Q LIST FOR WAITING REQUESTS.
CI: CHANNEL INTERFACE.

* REQUESTS ARE GRANTED IN FIFO ORDER.

*FLOWCHART OF LOCK MODULE OPERATION*

*Fig. 5*
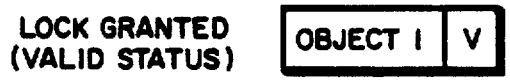
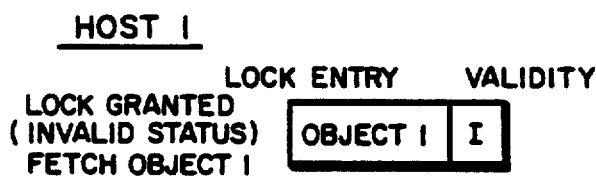
*Fig. 6*
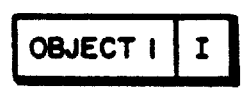
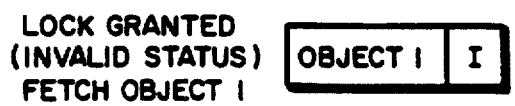
*Fig. 7*

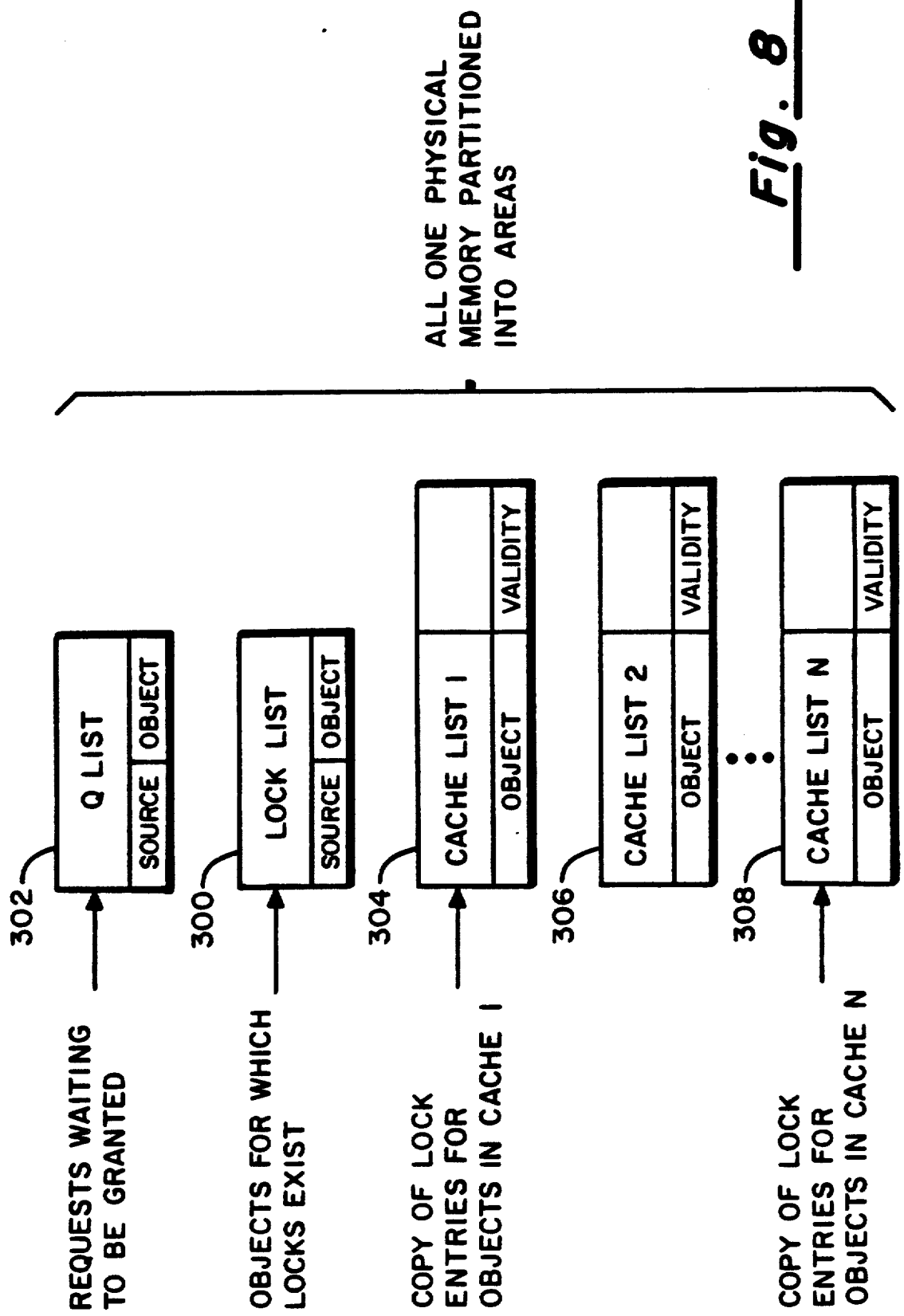

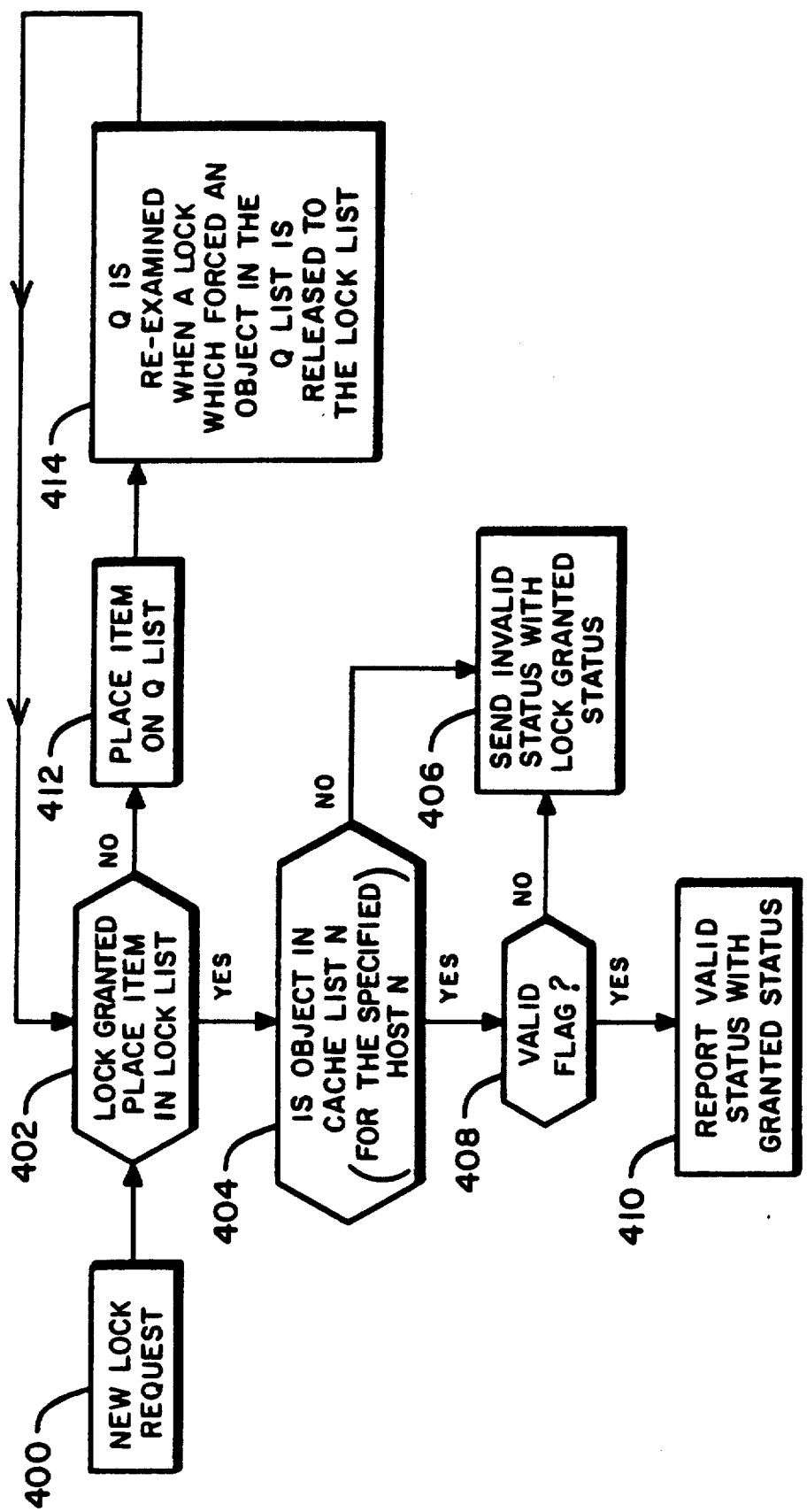

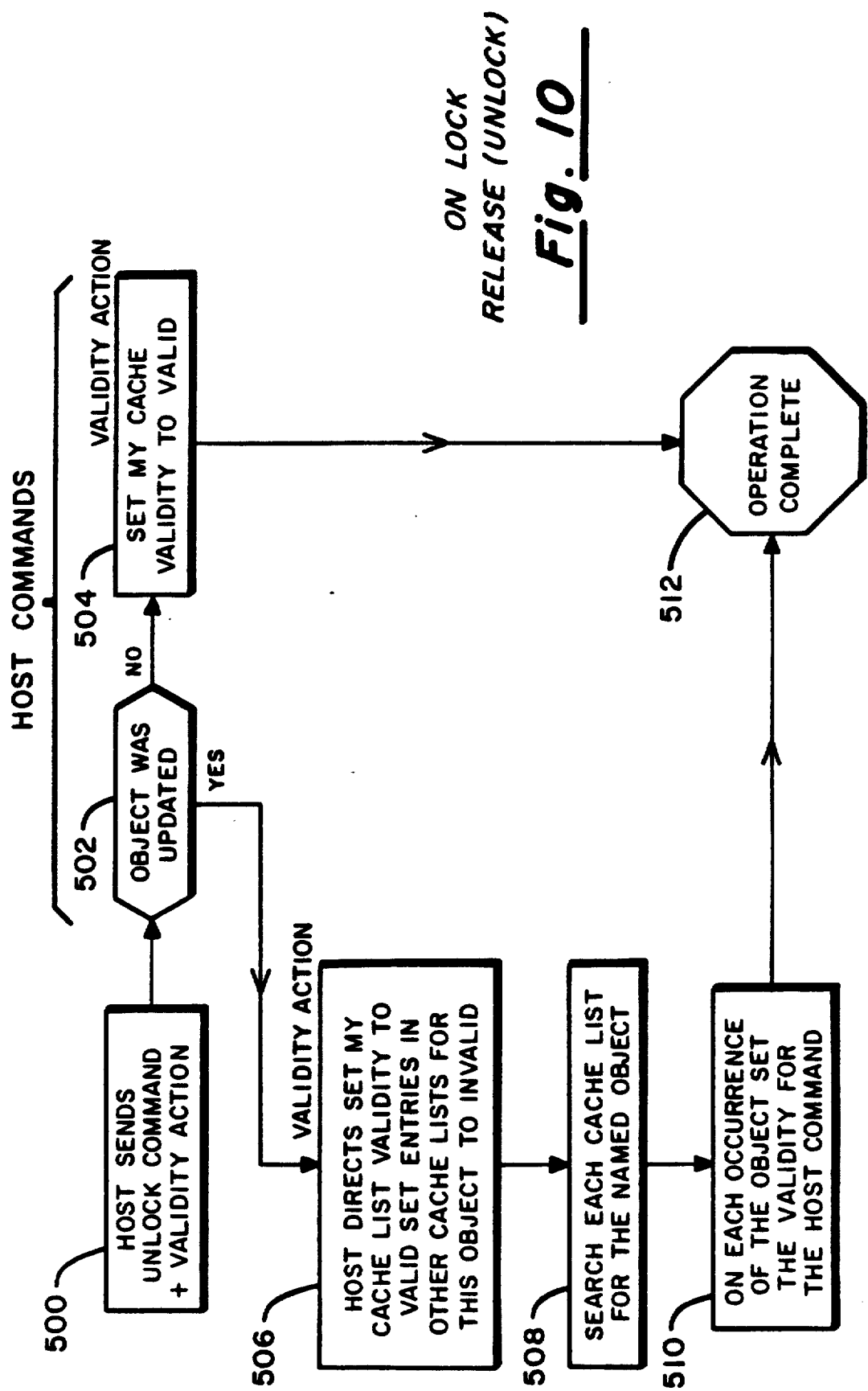

LOCKING CONTROL WITH VALIDITY STATUS INDICATION FOR A MULTI-HOST PROCESSOR SYSTEM THAT UTILIZES A RECORD LOCK PROCESSOR AND A CACHE MEMORY FOR EACH HOST PROCESSOR

BACKGROUND OF THE INVENTION

1. Field of the Invention

This invention relates to the determination of valid data in a local cache of a multiprocessor or multipath, multi-cache system and, more particularly, to a system which utilizes a common Record Lock Processor.

2. Background Description

A Record Lock Processor (RLP) is a special processor that facilitates the coordinated use of the shared mass storage in a high transaction environment, such as for example, airline reservation systems. U.S. patent application Ser. No. 167,748, filed Mar. 14, 1988 in the names of Ralph E. Sipple, John O. Sjolander, Marvin W. Theis and John R. Jordan, which is assigned to the assignee of the present invention is directed to such a Record Lock Processor. U.S. patent application Ser. No. 167,748, is hereby incorporated by reference in this document. In tightly coupled systems (i.e., systems where multiple processors share common mass storage) queuing for internal memory references may occur in addition to queuing for the use of a mass storage record.

With a Record Lock Processor, queuing and contention for common resources may be directed to mass storage records which are shared among multiple hosts in a loosely coupled system where each data processing device may have its own operating system. In transaction applications where a large number of data processors share a memory, the efficiency of a loosely coupled system using a Record Lock Processor can be greater than the efficiency of a tightly coupled system.

The efficiency of a loosely coupled system is approximately constant as more processors are added to the network. The efficiency of tightly coupled systems, however, decreases with each additional processor. This means that each successive processor added yields less additional net system throughput than did the previous processor that was added.

Each of the hosts of a multihost system may have their own local I/O cache memory which share mass storage (disk) resources. In operation these cache memories generally store validating bits which are set and cleared in order to verify that data stored in each cache memory matches data stored in the common mass storage. A problem arises in such multihost systems when an object is resident in one or more hosts' dedicated cache memories at a given instant of time and another host, (or other device capable of storing into shared mass storage), stores information into that mass storage address. If one of the plural processors modifies that data object with a write operation, steps must be taken in order to preserve the integrity of the data to prevent a processor from obtaining a data object from its own dedicated cache which is no longer current with the mass storage, because a write operation has been performed by a different processor.

When an object is updated by a host an invalidate message or signal is sent to the other hosts in the network that their copies of this object are invalid because the sender of the message has updated the object. This approach involves considerable traffic in sending and acknowledging the invalidate message. For N hosts there are 2(N−1) messages for each update. As N grows the traffic for invalidate is so excessive that the approach is rendered infeasible.

Duplicate or ambiguous results must be avoided when data is copied into a requestor's cache memory if that data object has been modified in the shared mass storage by a different host requestor. In the present invention the validity status of objects in a host main memory cache is implemented along with the locking function. The Record Lock Processor then indicates when a new Object has been fetched and the cache entry copy of this Object provides a validity status indication. The Record Lock Processor is told when a host has updated an Object, and the cache entry copy of the updated Object is set to Valid, while the cache entry copies of this Object for other hosts are set to Invalid.

If another host then tries to re-use the data object, the other host will receive an Invalid status indication which results in a refetch of the data from mass storage. If no other host has updated an Object, the requesting host will obtain a Valid status indication if the entry is still in its Cache List in the RLP. If the Object is Valid and the requesting host has a copy in his cache, the requesting host can re-use the Object in his cache.

SUMMARY OF THE INVENTION

A multihost system includes cache memories which are unique to each host wherein a host may be a multiprocessor. In a multihost network each host has its own operating system, and a common mass storage for the hosts which utilize a central Record Lock Processor. The history of an entry of an Object in a cache memory is recorded in a Lock List memory that keeps track of the Object and a Cache List which keeps track of the memories in which the Object has been stored. When more than one host has requested the same Object, the history of the subsequent requests are stored in a Queue List which allows the entries in the Queue List to move in sequence toward entry into the Lock List from which current entries are serviced.

The entries in the Lock List and the Queue List include a first set of bits that indicate the host and cache memory involved and a second set of bits that identify the Object. The Cache Lists store the Object and the validity status of the Object. When a host processor obtains a lock on an Object it reads the Object and the locking facility reports the validity status of the Object to the host. If the host has a copy of the Object in its cache, no other host has modified that Object and the subject host last used it, the Object is Valid. When a host modifies the Object, the Object is Valid only for the host that last used it.

If the Object is Valid the host reads the Object from its associated cache memory for the subject host if it is present there. Otherwise it is read from the common mass storage. After reading the Object it is placed into the associated cache memory if it were not there previously. When this host processor releases its lock, it marks the Validity Bit of entries in its Cache List as Valid and marks all other entries of this Object in other Cache Lists as Invalid. The invention thus keeps track of the validity of Objects stored in a number of cache memories under control of the requesting host processors which eliminates the need to coordinate invalidate message traffic between hosts that was required by prior systems.

BRIEF DESCRIPTION OF THE DRAWING

FIG. 5 is a bit identification chart that defines the lock entry words used to implement the invention.

FIG. 6 is a chart that shows validity bit status during the locking of an Object when no conflict occurs.

FIG. 7 is a chart that shows the validity bit status during the locking of an Object when conflict occurs.

FIG. 8 is diagrammatic showing of the partitioning of the memory of the Record Lock Processor.

FIG. 9 is a flow chart of the record locking operation of the Record Lock Processor.

FIG. 10 is a flow chart of the record unlocking operation of the Record Lock Processor.

TECHNICAL DESCRIPTION OF THE INVENTION

Description of the Record Lock Processor System

Figure 1:
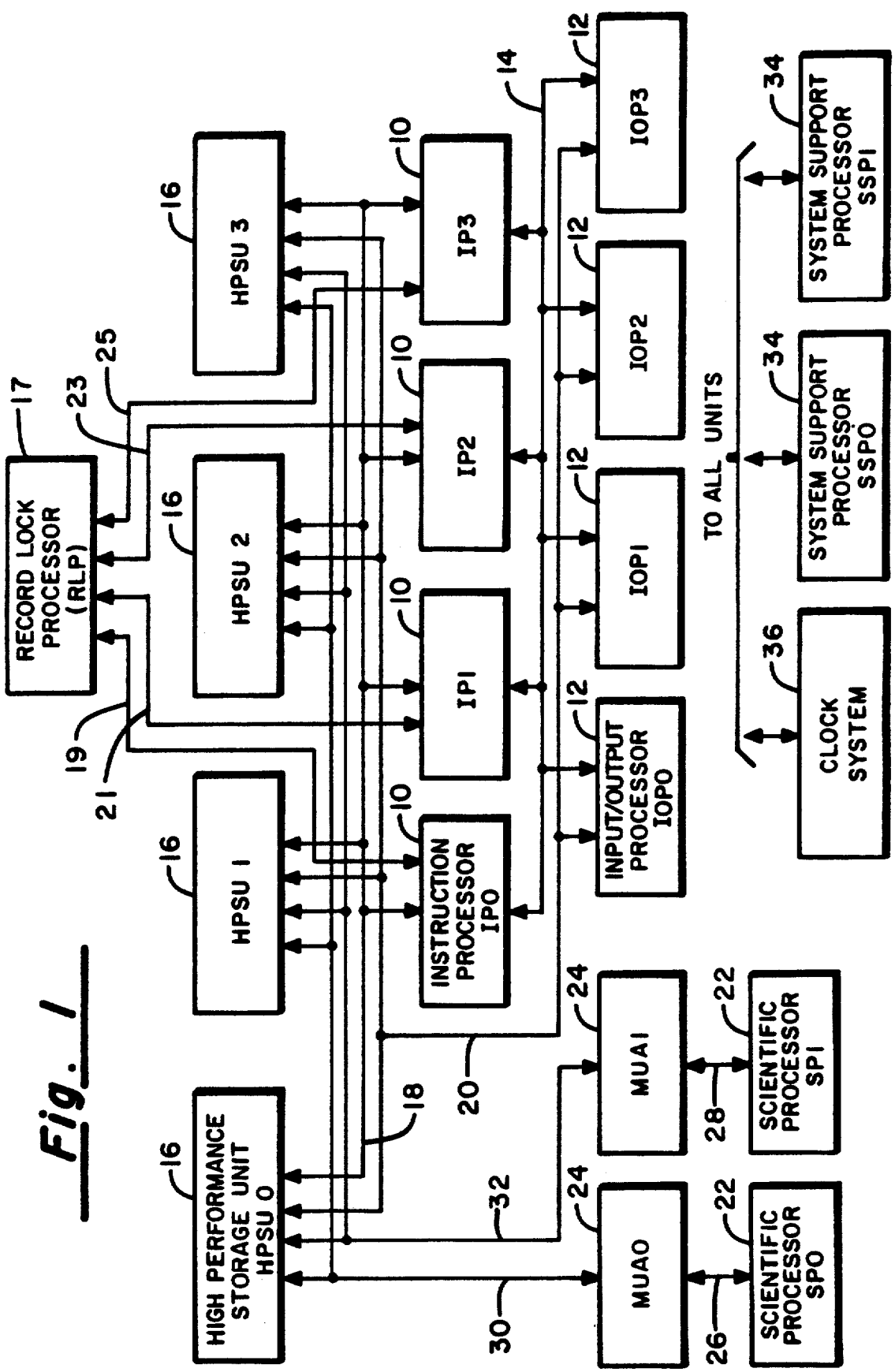
FIG. 1 is an overall block design of a multiprocessor data processing system which utilizes a Record Lock Processor.

FIG. 1 shows a system block diagram of an over-all digital data processing system in which the invention can be utilized. The system of FIG. 1 is described in more detail in U.S. Pat. No. 4,649,475, which issued Mar. 10, 1987 in the name of James H. Scheuneman, and which is owned by the assignee of the present invention. While the present invention is described by reference to the system of U.S. Pat. No. 4,649,475, it is not limited to use with such a system, but is applicable to other systems as well.

For the configuration illustrated, from one to four Instruction Processors IP0 through IP3, each labelled 10, can be utilized. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input/Output Processors IOP0 through IOP3, labelled 12, can be utilized. The interconnections between the IPs and the IOPs, collectively labelled 14, are, in fact, direct connections between each unit, and the interconnection is not bused. The IOPs handle all communications between the IPs, and the memory systems, and the peripheral subsystems (not shown). In this type of configuration, the IPs function as processing Units, and the IOPs act as CPUs to handle all of the communications.

From one to four High Performance Storage Units HPSU0 through HPSU3, each labelled 16, can be utilized in the system. Each HPSU is a free-standing unit with multiple memory Banks. Each HPSU provides four Instruction Processor (IP) ports for providing communication paths to the IPs, both for reading and writing, shown collectively as interconnection paths 18. Again, it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SPO) port. Each SP port has a four-word data interface. The IOP and IP interfaces operate on a 60 nanosecond clock cycle and the SP interface operates on a 30 nanosecond clock cycle. Error Correction Code (ECC) is used internal to each HPSU to provide single-bit error correction and double-bit error detection.

In the embodiment illustrated one or two Scientific Processors SP0 and SP1, labelled 22, can be utilized. If a single SP is used with a single HPSU, it may be coupled directly to the SP port of such HPSU. When two or more HPSUs are used with an SP, it is necessary to provide a Multiple Unit Adapter (MUA) for each SP. In this configuration MUA0 and MUA1, each labelled 24, are coupled to SO0 and SP1, respectively, across interface lines 26 and 28. MUA0 is coupled to each HPSU through interconnection path 30, and MUA1 is coupled to each HPSU through interconnection path 32. Each SP functions under direction of one or more of the IPs to perform scientific type calculations in a support mode. In this regard, the IPs can be considered to be host processors and the SPs can be considered to be support processors, all operating through common storage.

The overall system maintenance and supervision is accomplished through one or two System Support Processors SSP0 and SSP1, each labelled 34, which are connected to all units of the system. The IP, IOP and SSP are available commercially and are utilized in the Unisys Corporation 1100 and 2200 systems. In general, it is understood that each SSP performs the function of a hardware maintenance panel for the system. The display and setting of information, the activation of most maintenance facilities, selecting modes of operation and the like, is done at the control section of the SSP.

A clock System 36 is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock.

Figure 2:
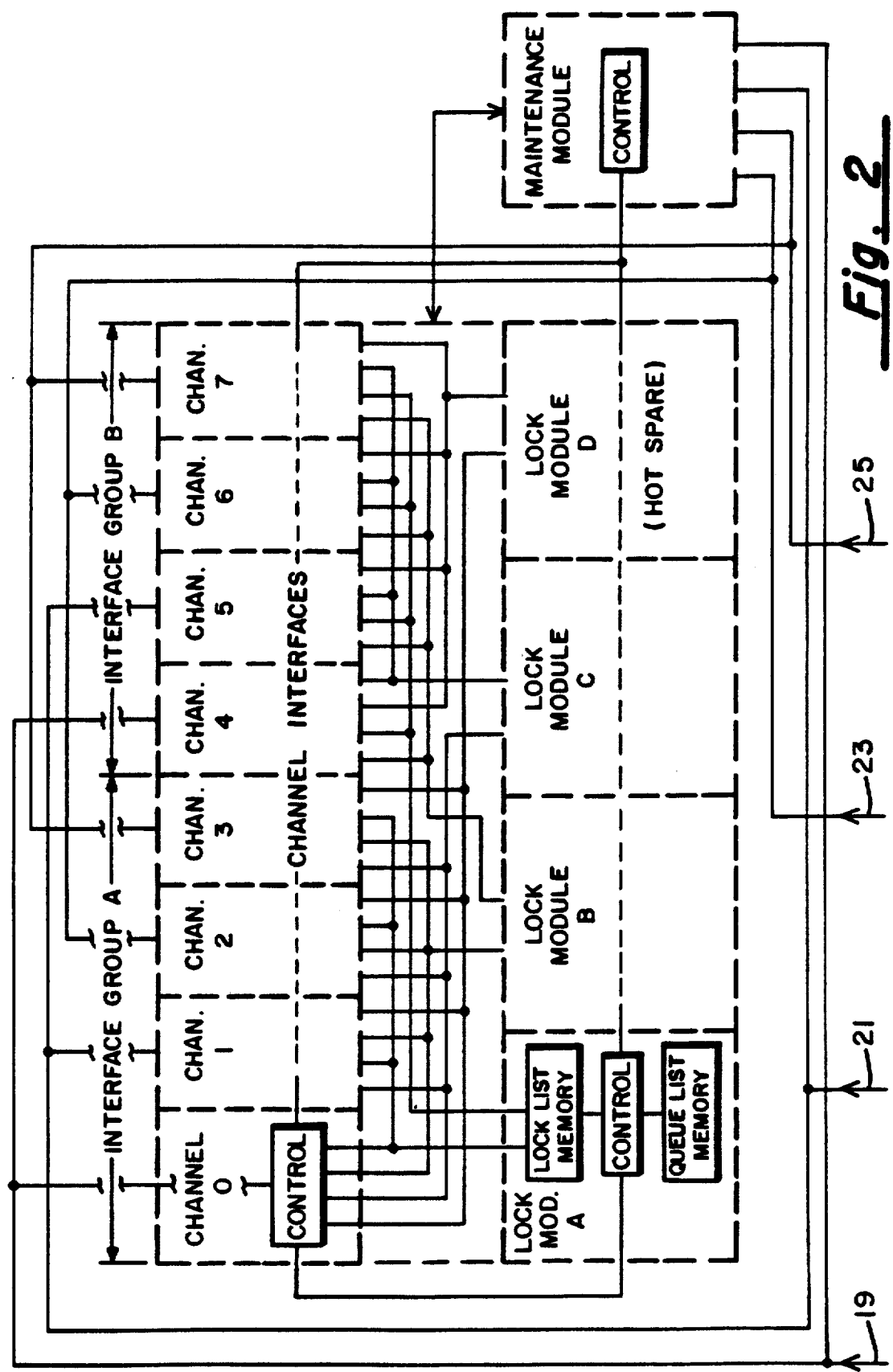
FIG. 2 is a detailed block diagram of the Record Lock Processor which is shown as a single block in FIG. 1.
Figure 3:
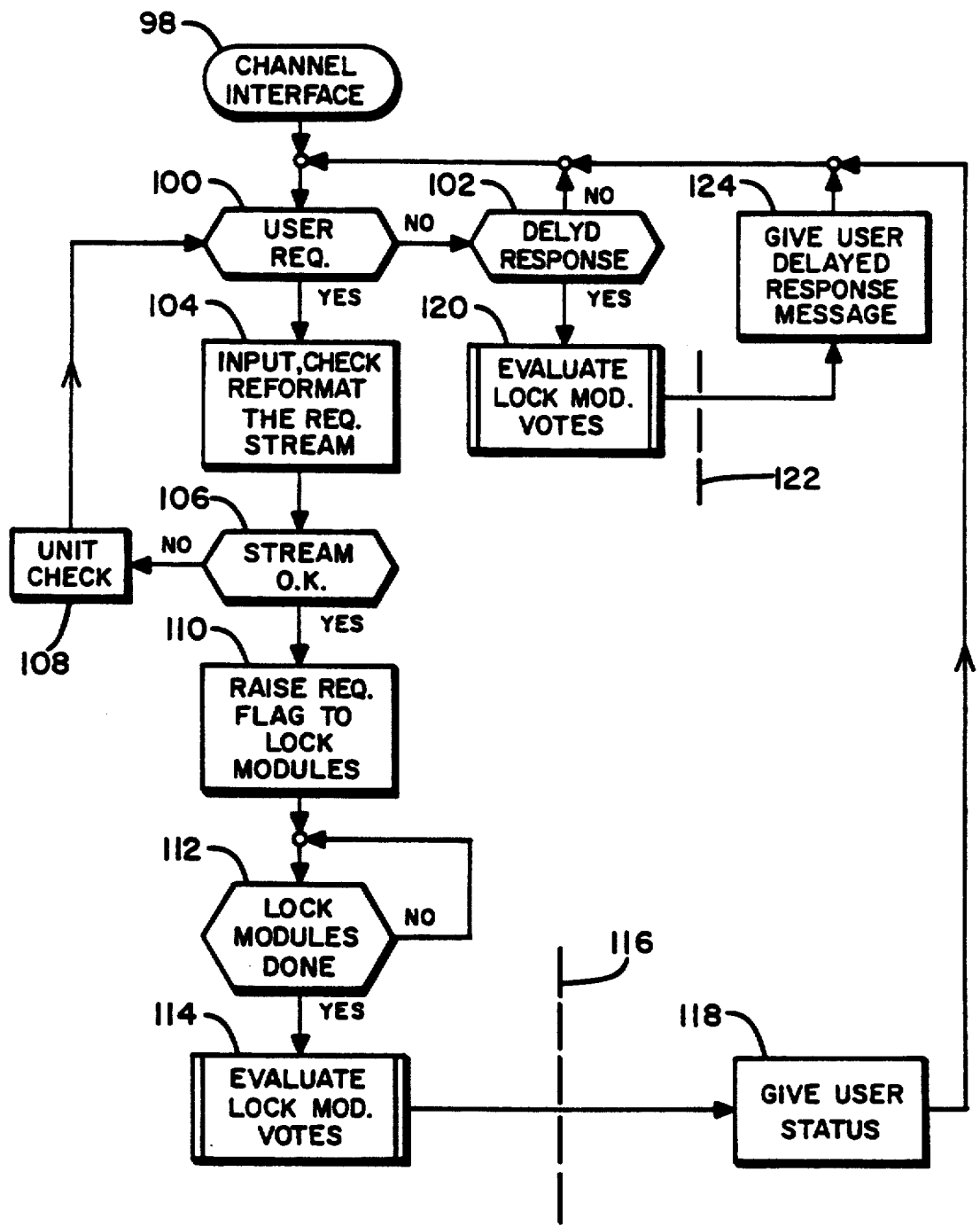
FIG. 3 is a flowchart of the operation of the programmable Channel Interface.
Figure 4:
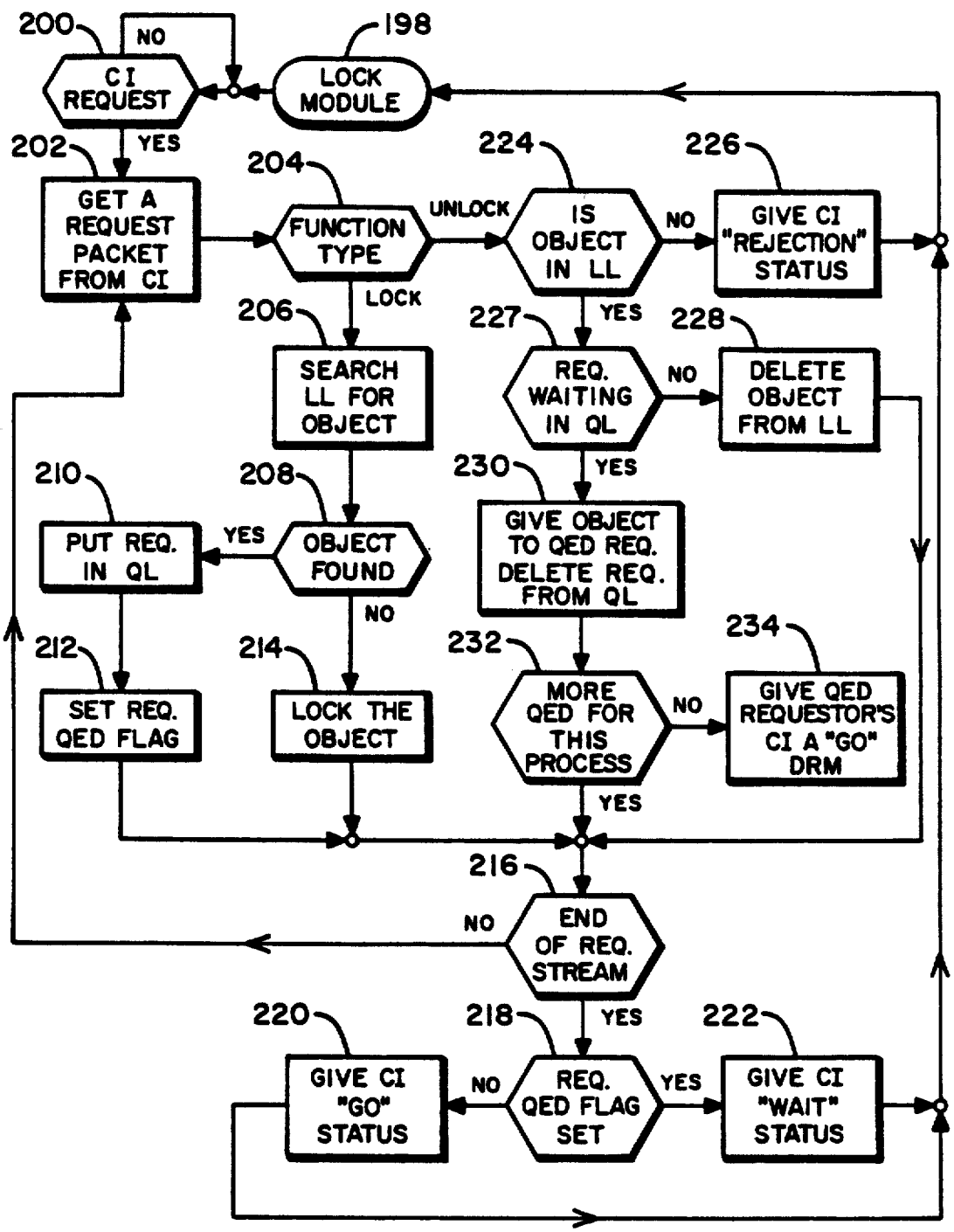
FIG. 4 is a flowchart of the operation of the programmable Record Lock Processor of FIG. 2.

The Record Lock Processor (RLP) 17 is coupled to the IPs by the lines 19, 21, 23 and 25, (as shown in FIGS. 1 and 2), and functions as an on-line peripheral device to manage record, block and file locks for all shared mass storage attached to a multi-host loosely coupled data processing system. It performs Write, Read and Sense commands to accept control packets and messages from the connected hosts and to send data packets, messages and status to the connected hosts. It also performs locking sub commands like Lock, Unlock, Forward Message, etc., to manage locks and messages and to perform the other functions of the RLP. The RLP is controlled by packets containing process, record, block, file parameters such as subcollection number, process number, and object name to identify the controlling entity and the target object. Control packets and messages can be sent individually or in streams.

As shown in FIG. 2 the RLP is composed of Lock Modules (LMs), Channel Modules (CMs) and a Maintenance Module (MM). The primary functional unit is the LM, which processes the locking functions. The CM performs all of the I/O functions and processes the votes received from the LMs on each locking function. The MM monitors the general health of the RLP and performs required test and maintenance functions. Full functionality of the RLP is provided by the combination of one Lock Module (LM) and one Channel Interface (CI). The multiple units provide redundancy to accommodate the failure of hardware components.

The memories of a Lock Module which has been powered down or out-of-service must be charged with a copy of the memory content of an on-line active Lock Module. The maintenance module checks the state of lock modules. A Lock Module which has been taken off line because it dissented on a vote is detected as an off-line unit by the Maintenance Module. A signal is sent to the host via the Maintenance Module to request that diagnostic tests be down line loaded and executed. The micro diagnostics are down line loaded into the subject Lock Module via the Maintenance Module. The operational microcode is also down line loaded into the lock module.

A signal is sent via the Maintenance Module to the subject Lock Module to start up. Upon receipt of the "start up" signal, the subject Lock Module selects an on-line Lock Module to request a charge up. The subject lock module controls the writing of all the Lock List and Queued List entries, and other necessary control information from one of the operating Lock Modules into the subject Lock Module. While the copy operation is in process, operation on the lock request is suspended. The duration of the suspension is approximately two seconds maximum in the described embodiment.

When the copy operation (charge up) is complete, the off-line Lock Module is normally placed in standby condition. In this condition it is the hot spare Lock Module. The subject Lock Module can alternately be placed in reserve standby if the maintenance tests indicate that the integrity of the recently tested Lock Module is questionable. In reserve standby the Lock Module cannot be switched in as an active voting member, however, other operations continue the same, that is, the subject Lock Module operates on the same data as the active Lock Modules and may be subject to further testing by the Maintenance Module.

Lock Module Description

The Lock Module (LM) executes the locking and unlocking operations in the RLP. Only lock module A is shown in detail since the other lock modules B, C and D are identical to lock module A. Each LM contains 4 Mbytes of microcode memory and 16 Kbytes of local memory. The LM hardware consists of three functional parts:

(1) The Lock Memory—this memory holds the lock entries and queued lock requests;

(2) a microcoded control section—this section executes the Lock/Unlock and Deadlock Detection algorithms; and (3) interfaces to the LMs, the CIs and the MM. This hardware connects to the other three Lock Modules (LMs), eight Channel Interfaces (CIs) and the Maintenance Module (MM).

The Lock Memory consists of:

(1) A Lock List which is the portion of the Lock Memory that is used to hold lock entries. Each entry consists of a record identifier, the name of the lock owner and certain other information;

(2) a Queue List which is the portion of the Lock Memory that is used to hold lock requests that are waiting to set locks on objects which are already in the Lock List, having been previously locked by some other Process. Whenever an object is unlocked, the Queue List is scanned for requests waiting to lock the unlocked object;

(3) Cache Lists which store the Object and the Validity status of each entry in the Cache Memories of the host processors; and (4) the Microcoded Control section.

Lock Memory Address Register (LMAR)

A 20 Bit LMAR in each LM preferably holds the current Lock Memory address. This size allows for addressing up to 2M words. LMAR is a write only register and changing the content of LMAR while a Lock Memory read or write is in process will result in corruption of the memory content. For this reason the entry of LMAR is interlocked with the Lock Memory timing such that the LM clock is stopped if LMAR is entered at an improper time. LMAR may be entered by the same microinstruction which initiates a Lock Memory operation.

Circular priority selection of Lock Request Buffer Available (LRB AV) allows signals from each of the Channel Interfaces to be serviced such that another LRB AV for the same CI will not be honored again until all of the other Channel Interfaces have been serviced.

The Channel Module (CM) consists of four, independent Channel Interfaces. Each Channel Interface (CI) provides the capability to communicate with a host system. It is used for transferring all operational requests from that host to the RLP and for transmitting responses back to the same host. Each CI exercises majority voting on all LM decisions and acts accordingly. Each CI in the preferred embodiment contains 24 Kbytes of microcode memory, 8 Kbytes of local memory and 165 Kbytes of buffer memory. The CI hardware consists of three functional parts:

A set of mailbox memories—These memories provide a means of communication with all four LMs.

A Block Multiplex interface—This interface provides the path of communication to the host system.

A microcoded control section—This section executes the Channel Interface algorithms.

The CI is designed for attachment to and interaction with the Block Multiplexer Channels of the host system and responds to multiple subsystem addresses.

Functional Overview

The Channel Interface (CI) is used as a front-end processor to the Lock Module (LM) for the purpose of locking and unlocking records and for performing diagnostic and maintenance functions. Because of this, the CI is geared in its hardware to perform the more time-consuming portions of the RLP work load.

Functionally, the CI performs all communication with the Host computer via a block mux channel. The communication may be done by microprogram control to allow a minimum of hardware to be used to implement the channel protocol mechanism. Command packets, such as Lock Record, sent by the host to the RLP are decoded and reformatted by the CI. The reformatting allows the command packet to be put in a form that is more easily processed by the LM.

After a command packet is reformatted by the CI, it is stored in four Lock Request Buffers (LRBs). These four LRBs are connected to the four LMs. This allows each of the LMs to work on the command packet independently. The LMs read data from the LRBs over an 8-bit bus and into their own working storages. The LMs then process the command packet and send the result to the CI's Delayed Response Buffers (DRBs). When all of the LMs have sent responses to the CI's command packet the CI evaluates the results in the DRBs. An evaluation consists of a majority vote on the contents of the DRBs. The contents that result in a majority are sent to the channel as the final response to the command. The DRBs are used for another purpose besides that of a response buffer as illustrated above. When an asynchronous event, such as the release of a record, occurs in an LM, the LM sends a packet to the CI's DRB. The CI recognizes this event and processes the packet.

There are a total of eight CIs in the RLP of the described embodiment. Each of the CIs communicate with four LMs of which a maximum of three are on-line at any one time. Two CIs in different modules are connected to each host computer, generally to different IOPs. This provides redundant paths between the RLP and the host computers should one CI go down. Each CI consists of four PC cards. One card is for the microprocessor, two cards are for the buffer, and one card provides Interface, Local Store, and Scan/Set functionality. A Channel Module (CM) in the described embodiment consists of four Channel Interface units plus one power control and Scan/Set fanout PC card. Operands may be 16 bits wide or more in the CI micro engine providing the required capability to process data passing through the channel interface.

Although several different memories may be used in the Record Lock Processor to store the Lock, Cache and Queue Lists, it is desirable for purposes of efficiency and economy to utilize one physical memory which is partitioned into the different list areas, as shown in FIG. 8. As shown in FIG. 5 the lock entry word or code is divided into three groups of bits. One group identifies the host processor source of the requested lock entry. A second group of bits identifies the Object upon which the source is requesting a lock, and the third group of bits are used to indicate the validity status of all entries in the queue list as either Valid or Invalid in accordance with the functioning of the present invention.

The partitioned memory includes one section 300 which serves as the Lock List. The lock list contains the source and object bits of the lock entry words for Objects which are locked by one or more processors. A second partitioned section of the memory 302 forms the Queue List which contains the source and object bits of the lock entry word for requested Objects upon which a host processor desires to place a lock, but which are already locked by another processor, as signified by a prior lock entry word in the Lock List for the same Object. The memory is further partitioned into a number of Cache Lists 304-308 which are arranged such that there may be one Cache List for each requesting processor, or one for each requesting application where a processor is capable of running multiple applications. The Cache List contains lock entry words which have a grouping of validity bits in addition to the source and object bits. The cache lists are under control of the requesting host processors, and by keeping track of the validity status of the Objects which are stored in the associated cache memory for each application of each host processor, a need to coordinate invalid message traffic between the hosts that was required in prior systems is eliminated.

Reference will now be made to FIGS. 6 through 10 in the discussion that follows which relates to the manner in which lock requests are granted and released or unlocked. The locking algorithm that is implemented in the record lock processor is discussed with reference to FIG. 6 for the case in which a processor is requesting the lock on an Object and there are no conflicting requests from other processors. The implementation of the locking algorithm in the case where there are conflicting requests from two or more host processors is discussed with reference to FIG. 7.

The locking request is initiated by a new lock request from the host processor, as indicated in step 400 of FIG. 9. If the requesting processor is the only processor requesting a lock on the particular object, the lock is granted in step 402 and control passes to step 404 where it is determined if the Object is the Cache List N, where N is the number associated with the requesting host. It is first assumed that the first request for the Object results in the determination that the Object is not in the associated cache after a searching of the Cache List. The Object is then fetched from backing memory in step 406, and an Invalid signal is sent from the cache along with a lock granted status from the Record Lock Processor to the requesting host processor. The requested Object is placed in the cache for the requesting processor, and it is utilized by the requesting processor until the processor decides to release, or unlock, the Object.

Upon the unlocking of the Object, the bits associated with the validity status of the Object in the cache are then marked Valid. Therefore, if the same host processor requests the same object once it is placed in the Cache List, control will pass to step 408 after the Cache List is searched and the Object is detected with a Valid status indication. In this instance there has been no other host processor which has utilized the requested Object in the intervening time between the first use of the Object in which it was fetched from the backing storage and placed in the cache and the second request by the same processor. The Valid status of the bits in the Cache List is reported along with the lock granted status to the requesting host processor. Upon unlocking of the Object, the validity status bits indicate that the Object stored in the associated cache list is Valid. In addition to the states of Valid and Invalid, the validity status bits may be used to indicate other status conditions. As one example, these bits may be used to represent an intermediate "pending" (i.e., neither Valid nor Invalid) state that allows for synchronization of the timing of the use of Objects by a host.

In the instance where there has been a storage of the Object in the Cache List of a requesting host processor and the validity status bits have been marked Valid upon the unlocking of the Object by that host processor, but a second host processor obtains a lock on the same Object while the first processor has a lock on the Object, the Object is placed into the Queue List in step 412, since an exclusive lock cannot be granted to the second host processor. At the same time, if the Object is in the Cache List for the second processor, it is marked Invalid because there can be only one Valid group of status bits. As previously mentioned, these will be the status bits that are associated with the processor which has assumed control of the Object. Thus when the first processor unlocks or releases the Object, its validity bits and its associated cache are marked Valid. If the subject processor has modified the Object, all of the other validity bits in all other Cache Lists for this Object are marked Invalid. When the first lock request is released, the prior Object in the Lock List which caused the Object to be placed in the Queue List for the second host processor request is removed from the Lock List and the Queue List is reexamined in step 414, and the Object in the Queue List is placed into the Lock List. The Object is then fetched for the second requesting processor, and, of course, is subject to further update by the second processor. On completion of the process of using and updating the Object and Unlocking by the second host processor, the Object in the Cache List has its validity status for the second processor updated to a Valid status, and all of the other validity bits for the other Cache Lists are marked Invalid, including those in the Cache List for the original processor which previously had control of the Object. Therefore, if the original processor again desires a lock on the Object, it can obtain the Object but initially its Cache List will indicate an Invalid status.

The portion of the locking control invalidation algorithm which is concerned with releasing or unlocking of an Object is shown in FIG. 10. At step 500 the host processor, after using the Object, sends an unlock command, and a validity action signals to the cache to update the validity status of the Cache List associated with the requesting processor, and to invalidate all of the other Cache List validity bits. Step 502 is dependent upon whether the Object was updated. If the Object is not updated then the control moves to step 504 where the requesting processor after utilizing the Object unlocks it and sets its own Cache List to indicate a Valid status. Since the Object was not updated, however, there is no necessity to set the validity bits for the other Cache Lists to Invalid. Thus it is possible for several objects to have a Valid status in different Cache Lists in this instance.

However, in the event that the host processor did update the Object, control is then passed to step 506 where upon unlocking it is now necessary to set to Valid status only the Cache List for the processor which did the updating, and to set to Invalid all of the Cache Lists for the other processors. This may be accomplished by searching (step 508) each Cache List for the named Object and (step 510) for each occurrence of the Object in a Cache List setting the validity bits under the control of a command from the host processor which is releasing the lock on the Object in question. The operation is now complete (step 512).

In the implementation and utilization of the present invention, the word "Object" is utilized to designate any convenient item of information that is stored and may consist of a record, file, word or any other structure, or organization, of information in an ordered manner. If the Lock List becomes filled, conventional aging algorithms, such as "least recently used" algorithms, may be implemented to age the first element into the stack out of the stack to make room for subsequent elements. The Queue List, like the Lock List, operates in a first-in-first-out manner (FIFO).

While in the present invention a copy of the Object is retained in the Cache List, it is apparent that to those skilled in the art, the invention may also be implemented in the Cache List by the utilization of pointers which point to a table that contains the stored Objects rather than with the duplicate storage of such Objects in the Lock Lists and also in the Cache Lists as implemented in the disclosed embodiment.

We claim:

1. A method for a multi-processor data system of controlling locking requests for objects that are stored in a shared memory in which some of said objects may also be stored in any of a plurality of cache memories and for indicating the validity of said objects that are stored in said plurality of cache memories wherein said system further comprises a plurality of processors each of which is coupled to, and associated with, one of said cache memories, and a locking control means that contains a separate cache list for each of the processors of the system is coupled between all of said processors and said shared memory, wherein said processors are capable of obtaining locks on selected ones of said objects under the control of said locking control means, of utilizing said selected ones of said objects, and of then unlocking said selected ones of said objects under the control of said locking control means comprising:

(A) transmitting lock entries from said processors to said locking control means, wherein each of said lock entries comprise source bits that identify the processor that requests a lock on a particular selected object, and associated object bits that identify the particular selected object upon which the lock is requested by the requesting processor, (B) entering the source bits and the object bits of those lock entries that represent objects upon which any processor of said plurality of processors have been granted a lock into a lock list in said locking control means as lock list entries, (C) determining if the object bits of requested lock entries are already stored in said lock list as lock list entries at the time that any of said processors requests a lock on any object specified by said object bits, (D) entering the source bits and the object bits of those lock entries that represent objects upon which any of said plurality of processors has requested a lock into a queue list in said locking control means as queue list entries when the requested lock on an object cannot be granted a lock because another lock list entry then exists in said lock list which also comprises the same object bits, (E) removing a lock list entry for any selected object from said lock list after a processor that obtained a lock on said selected object has utilized said selected object, and has directed the locking control means to unlock the lock on said selected object, (F) entering a queue list entry from said queue list into said lock list as a lock list entry when no lock list entry exists in said lock list which then also comprises the same object bits, (G) granting locks on the objects represented by lock list entries in said lock list, (H) entering the object bits of all objects that are stored in said cache memories in separate cache lists in said locking control means as cache lists entries, each of said cache lists being associated with one of said processors, (I) comparing the object bits of each lock list entry that represents an object upon which a lock has been granted to the object bits stored as cache list entries in the cache list in said locking control means that is associated with the processor that was granted said lock to determine if said locked object is then stored in the cache memory that is associated with said processor that was granted said lock, (J) checking the validity bits associated with said locked object if it is determined that said locked object is stored in said cache memory of its associated processor to determine if said stored locked object indicates a valid or invalid status, (K) sending both lock granted and invalid status indications to a processor that has requested a lock on a selected object if either said selected object is not identified by object bits in the cache list that is associated with said requesting processor, and therefore said selected object upon which a lock is requested is not stored in said cache memory of its associated processor, or if said validity bits for said selected object that is stored in said associated cache list indicate an invalid status for said selected object, (L) obtaining said selected object for said requesting processor from said shared memory and storing said selected object in said associated cache memory that is associated with said requesting processor if said lock is granted and said validity bits in said associated cache list indicate an invalid status for said selected object, (M) sending both lock granted and valid status indications to the processor that has requested a lock on a selected object if said selected object was identified by object bits in the cache list that is associated with the processor that has requested a lock on the selected object and said validity bits in said associated cache list indicate a valid status, (N) obtaining said selected object for said requesting processor from the cache memory that is associated with said requesting processor if said lock is granted on said selected object and said validity bits for said selected object in the cache list for the associated processor indicate a valid status, (O) transmitting an unlocking command from said requesting processor to said locking control means after said selected object upon which a lock has been obtained has been utilized by said requesting processor, (P) setting to indicate a valid status the validity bits of each cache list entry that represents each selected object upon which a lock was obtained by any of said processors for each selected object which was utilized by the requesting processor that obtained the lock, and which was returned in an unmodified form to the same cache memory from which it was obtained, (Q) setting to indicate an invalid status the validity bit of each cache list entry that represents a selected object upon which a lock was obtained by a requesting processor that was either (1) obtained from said shared memory and utilized by said requesting processor, or (2) obtained from a cache memory associated with the processor that obtained the lock on said selected object, utilized by the requesting processor and then returned to the same cache memory in modified form, and (R) setting to indicate an invalid status, in both instances (1) and (2), the validity bits of all other lock entries of all of the other cache list entries which comprise the same object bits as said selected object that has been utilized by said requesting processor upon receipt of said unlocking command by said locking control means from said requesting processor.

* * * * *